(12) United States Patent
Rikola et al.

(10) Patent No.: US 7,215,929 B2
(45) Date of Patent: May 8, 2007

(54) METHOD AND APPARATUS FOR MAINTAINING DESIRED LINK QUALITY WHEN NO DATA IS TRANSMITTED ON TRANSPORT CHANNELS HAVING QUALITY TARGETS

(75) Inventors: Outi Rikola, Oulu (FI); Anna-Mari Seppänen, Oulu (FI)

(73) Assignee: Nokia Corporation, Espoo (FI)

( * ) Notice: Subject to any disclaimer, the term of this patent is extended or adjusted under 35 U.S.C. 154(b) by 530 days.

(21) Appl. No.: 10/266,237

(22) Filed: Oct. 8, 2002

(65) Prior Publication Data

US 2004/0203457 A1  Oct. 14, 2004

(51) Int. Cl.
*H04B 17/00* (2006.01)

(52) U.S. Cl. ............ 455/67.11; 455/69; 455/63.3; 455/522; 455/442; 455/437; 455/452.2; 455/67.13; 370/331; 370/335; 370/342; 370/330; 375/262; 375/285

(58) Field of Classification Search .......... 455/522, 455/69, 437, 442, 67.11, 452.2, 436, 503, 455/67.3, 63.3; 370/335, 331, 330, 342, 370/252; 45/67.13; 375/262
See application file for complete search history.

(56) References Cited

U.S. PATENT DOCUMENTS

| | | | | |
|---|---|---|---|---|
| 6,166,622 | A * | 12/2000 | Hosur et al. ............. | 340/318 |
| 6,331,975 | B1 * | 12/2001 | Hosur et al. ............. | 370/342 |
| 6,374,118 | B1 * | 4/2002 | Toskala et al. .......... | 455/522 |
| 6,430,398 | B1 * | 8/2002 | Blanc ..................... | 455/67.13 |
| 6,487,394 | B1 * | 11/2002 | Ue et al. ................. | 455/69 |
| 6,493,541 | B1 * | 12/2002 | Gunnarsson et al. ..... | 455/69 |
| 6,493,564 | B2 * | 12/2002 | Longoni et al. ......... | 455/522 |
| 6,519,461 | B1 * | 2/2003 | Andersson et al. ...... | 455/453 |
| 6,549,785 | B1 * | 4/2003 | Agin ....................... | 455/522 |
| 6,567,670 | B1 * | 5/2003 | Petersson ................ | 455/522 |
| 6,597,894 | B1 * | 7/2003 | Ue et al. ................. | 455/69 |
| 6,600,772 | B1 * | 7/2003 | Zeira et al. ............. | 375/130 |
| 6,603,773 | B2 * | 8/2003 | Laakso et al. .......... | 370/441 |
| 6,611,676 | B2 * | 8/2003 | Ue et al. ................. | 455/69 |

(Continued)

OTHER PUBLICATIONS

Holma et al., "WCDMA for UMTS", Wiley & Sons, ISBN 0 471 720518, pp. 34-37 and 196-203, Jun. 2000.

*Primary Examiner*—Marceau Milord
(74) *Attorney, Agent, or Firm*—Harrington & Smith, PC

(57) ABSTRACT

Disclosed is a mobile station executed method for updating a signal-to-interference ratio (SIR) target during a discontinuous transmission (DTX) period of a downlink transport channel having a network specified quality target value, as is a mobile station (100) that operates in accordance with the method. The method includes measuring a quality, such as the BLER, of another downlink transport channel for which a network (20) has not specified a quality target value; and updating the SIR target in accordance with the measured quality. For a case where the downlink transport channel for which the network has not specified a quality target value is on a power controlled physical channel, updating the SIR target uses the measured quality. For a case where the downlink transport channel for which the network has not specified a quality target value is on a non-power controlled physical channel, updating the SIR target includes: (a) determining a mapping function, (b) applying the mapping function to the measured quality to obtain a weighted quality, and (c) using the weighted quality for updating the SIR target. In the preferred embodiment the mobile station conforms to a wide bandwidth, code division multiple access (WCDMA) third generation partnership project (3GPP) air interface standard.

20 Claims, 5 Drawing Sheets

U.S. PATENT DOCUMENTS

| | | | |
|---|---|---|---|
| 6,622,024 B2 * | 9/2003 | Koo et al. | 455/522 |
| 6,760,303 B1 * | 7/2004 | Brouwer | 370/229 |
| 6,768,727 B1 * | 7/2004 | Sourour et al. | 370/335 |
| 6,807,164 B1 * | 10/2004 | Almgren et al. | 370/342 |
| 6,832,095 B2 * | 12/2004 | Haim | 455/522 |
| 6,842,616 B2 * | 1/2005 | Takano et al. | 455/435.2 |
| 6,862,458 B2 * | 3/2005 | Kanemoto et al. | 455/522 |

* cited by examiner

METHOD AND APPARATUS FOR MAINTAINING DESIRED LINK QUALITY WHEN NO DATA IS TRANSMITTED ON TRANSPORT CHANNELS HAVING QUALITY TARGETS

TECHNICAL FIELD

These teachings relate generally to mobile telecommunications systems and methods and, more specifically, to those systems using outer loop power control and quality targets for transport channels, such as systems conforming to a wide bandwidth, code division multiple access (WCDMA) third generation partnership project (3GPP) air interface standard.

BACKGROUND

The channels offered by the physical layer to Layer 2 for data transport between peer L1 entities are denoted as transport channels in the 3GPP specification. Different types of transport channels are defined by how and with what characteristics data is transferred on the physical layer. A dedicated transport channel carries information from logical dedicated traffic channels or dedicated control channels. Several different logical channels (and services) can use the same transport channel, and several different transport channels can be multiplexed to one physical channel. The transport block lengths, transmission time intervals (TTI), interleaving depth, forward error correction (FEC) encoding/decoding, and so forth can be defined separately for each transport channel. The physical layer adds a cyclic redundancy check (CRC) for each transport block.

In a WCDMA system outer loop power control is used to maintain communications at the desired quality level by setting the signal-to-interference ratio (SIR) target for the fast, closed loop power control. In different environments, and for different services, different SIR targets are needed to obtain the same received quality. The SIR target value is adjusted according to an autonomous function in the mobile station in order to achieve the same measured quality as the quality target set by the Universal Terrestrial Radio Access Network (UTRAN). The quality targets can be set based on the transport channel block error rate (BLER) values for the transport channels, as signaled to the mobile station by the UTRAN. The UTRAN does not necessarily set a quality target for all transport channels.

Note that outer loop power control and fast, closed loop power control can exist simultaneously in both the uplink and downlink directions. In the WCDMA system of most interest to this invention both are present, and the mobile station is defined as the entity for controlling the open loop power control for the purpose of setting and adjusting the downlink SIR target for a network-specified link quality is met for each transport channel (e.g., for a specified link quality based on some specified value of BLER).

Further reference with regard to power control in general, and outer loop power control in particular, can be made to "WCDMA for UMTS", by Harri Holma and Antti Toskala, Wiley & Sons, ISBN 0 471 720518, pages 34–37 and 196–203, incorporated by reference herein.

It is noted that in the 3GPP WCDMA system there can be periods of time when no data is transmitted on a transport channel. These periods can be referred to as periods of Discontinuous Transmission, or DTX. This is a problematic situation for the downlink outer loop power control function of the mobile station, as the received signal quality cannot be determined, resulting in the occurrence of wasted capacity or unnecessary errors.

That is, a problem is created if all transport channels that have a BLER target are in a state where no data is transmitted, as the BLER (quality) of these transport channels cannot be measured and used by the mobile station to determine the SIR target that is required to maintain the BLER at the specified level. As a result, when the data transmission once more begins either unnecessary errors are generated (the SIR target is set too low) or capacity is wasted (the SIR target is set too high), if the environment has changed during the time when data was not transmitted, and the SIR target was not updated to the level needed to maintain the BLER at the required level.

Reference can be made in this regard to FIG. 1, where the top trace shows the intervals when data is and is not transmitted relative to the variable SIR target and the transport channel BLER target. Note that during the time that the data is not transmitted the SIR target must be increased in order to maintain the required BLER, but no data is present for the mobile station to use in updating the SIR target. As a result, when the data is again present the SIR target is actually too low, it being assumed that environmental conditions have changed during the time that the data was not transmitted.

While it may appear that one could deal with this problem in a simplistic fashion by maintaining the SIR target constant when no data is transmitted, this approach would be undesirable, as the required SIR target value may change during the time when no data is transmitted (during DTX).

A need thus exists for an outer loop power control technique that follows the changes of the environment during DTX, enabling the SIR target value to be maintained at approximately the required level. Prior to this invention, this need was not fulfilled.

SUMMARY OF THE PREFERRED EMBODIMENTS

The foregoing and other problems are overcome, and other advantages are realized, in accordance with the presently preferred embodiments of these teachings.

Disclosed is a mobile station executed method for updating a signal-to-interference ratio (SIR) target during a discontinuous transmission (DTX) period of a downlink transport channel having a network specified quality target value, as well as a mobile station that operates in accordance with the method. The method includes measuring a quality, such as the BLER, of another downlink transport channel for which the network has not specified a quality target value; and updating the SIR target in accordance with the measured quality. For a case where the downlink transport channel for which the network has not specified a quality target value is on a power controlled physical channel, updating the SIR target uses the measured quality. For a case where the downlink transport channel for which the network has not specified a quality target value is on a non-power controlled physical channel, updating the SIR target includes: (a) determining a mapping function, (b) applying the mapping function to the measured quality to obtain a weighted quality, and (c) using the weighted quality for updating the SIR target. In the preferred embodiment the mobile station conforms to a wide bandwidth, code division multiple access (W-CDMA) third generation partnership project (3GPP) air interface standard.

In accordance with this invention, a required SIR target is enabled to change when the environment changes during a DTX period, enabling the required link quality to be maintained during DTX, which is the desired result.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 2:
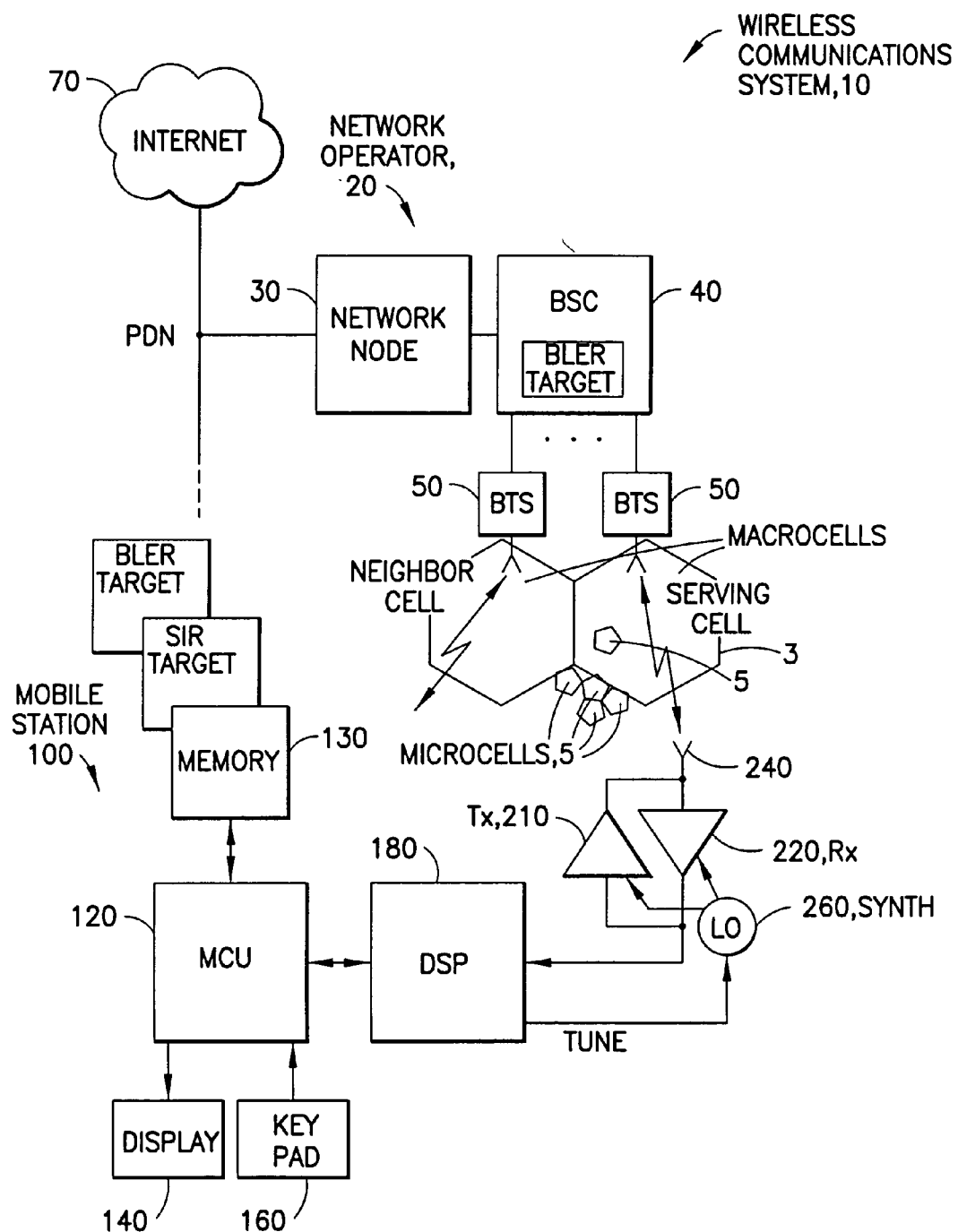
FIG. 2 is a simplified block diagram of a wireless telecommunications system that includes a mobile station, and that is suitable for practicing this invention.

Referring to FIG. 2, there is shown as a simplified block diagram an embodiment of a wireless communications system 10 that is suitable for practicing this invention. The wireless communications system 10 includes at least one mobile station (MS) 100, also referred to generically as user equipment (UE). FIG. 2 also shows an exemplary network operator 20 having, for example, a node 30 for connecting to a telecommunications network, such as a Public Packet Data Network or PDN, at least one base station controller (BSC) 40, and a plurality of base transceiver stations (BTS) 50 that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A macrocell 3 is associated with each BTS 50, and will generally be one of a serving cell or a neighbor cell with regard to the mobile station 100. One or more smaller picocells or microcells 5 may also be available to the mobile station 100.

The air interface standard can conform to any suitable standard or protocol, and may enable both voice and data traffic, such as data traffic enabling Internet 70 access and web page downloads. In the presently preferred embodiment of this invention the air interface standard is compatible with a wide bandwidth code division multiple access (WCDMA) third generation (3G) air interface standard, although this is not a limitation upon the practice of this invention.

The mobile station 100 typically includes a control unit or control logic, such as a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. The ROM is assumed, for the purposes of this invention, to store a program enabling the MCU 120 to execute the software routines, layers and protocols required to implement the methods in accordance with these teachings, as well as to provide a suitable user interface (UI), via display 140 and keypad 160, with a user. Although not shown, a microphone and speaker are typically provided for enabling the user to conduct voice calls in a conventional manner.

Figure 5:
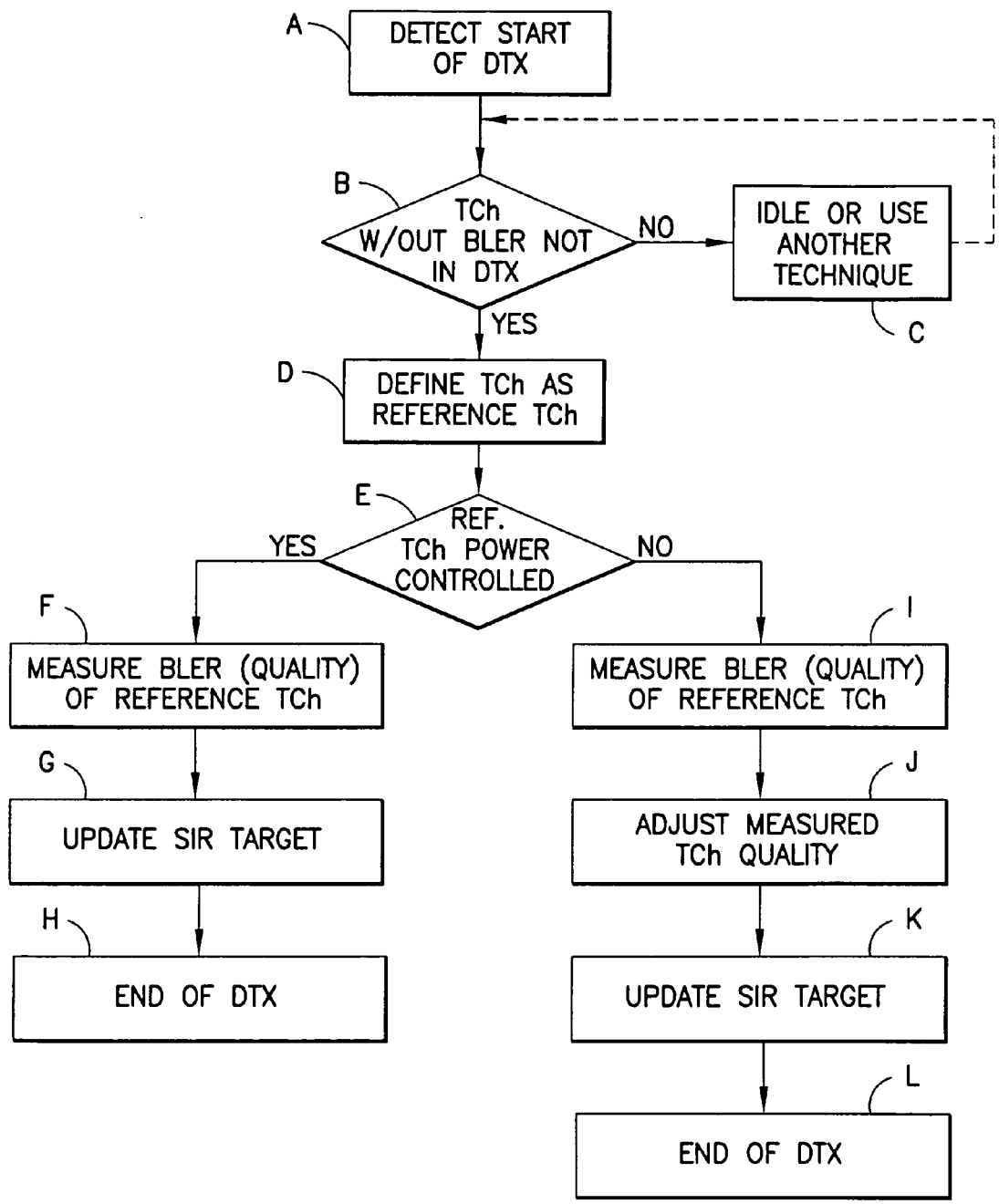
FIG. 5 is a logic flow diagram that illustrates a method in accordance with this invention.

The memory 130 is assumed as well to store the BLER target received from the network 20, as well as the current value of the SIR target, and any other information required by the MS 100 to execute the methods of this invention (see, for example, FIG. 5).

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator (LO) 260, such as a frequency synthesizer, is provided for tuning the transceiver. Data, such as digitized voice and packet data, is transmitted and received through the antenna 240.

Figure 1:
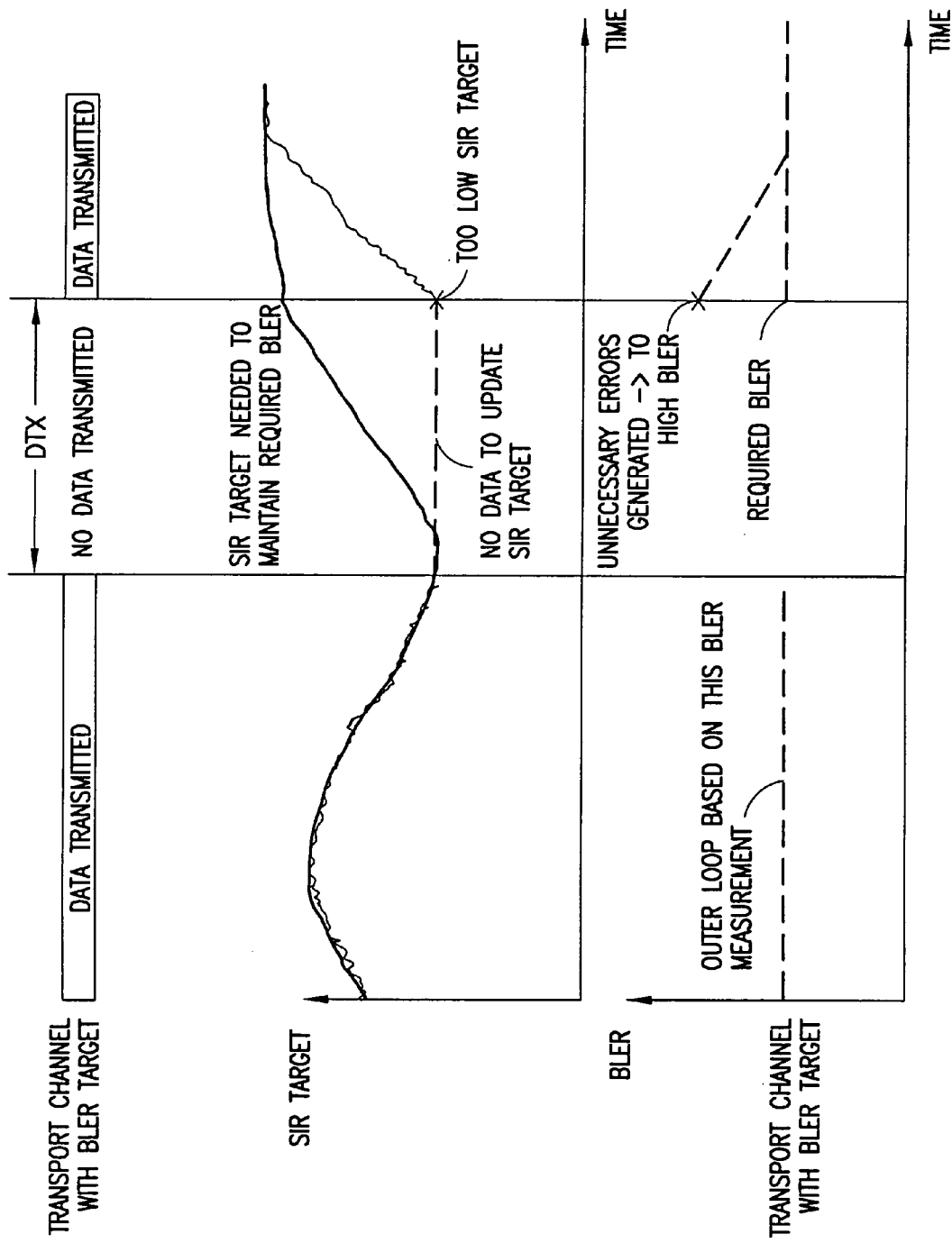
FIG. 1 is diagram illustrating the problem that occurs in the prior art during DTX on a transport channel having a BLER target.

In accordance with this invention, the problem described above and illustrated in FIG. 1 is overcome, during the time when all transport channels having a BLER target are in a state when no data is transmitted, as the outer loop power control is based on transport channels not having BLER targets. These transport channels are referred to herein as reference transport channels.

If the reference transport channels are transmitted on a power controlled physical channel, e.g., on a DPCH (Dedicated Physical Channel), the outer loop maintains their quality at the same level as it was when data was transmitted on those transport channels having BLER targets. This mode of operation is shown in FIG. 3.

If, instead, there are no reference transport channels on a power controlled physical channel, the quality of a non-power controlled channel, e.g., a P-CCPCH (Primary Common Control Physical Channel), is used to control the SIR target of the power controlled physical channels. In order to accomplish this, it is preferred to perform mapping of the quality of these channels to the SIR target. Knowledge of the quality relationship to the power controlled transport channels is assumed. This mode of operation is illustrated in FIG. 4.

Figure 3:
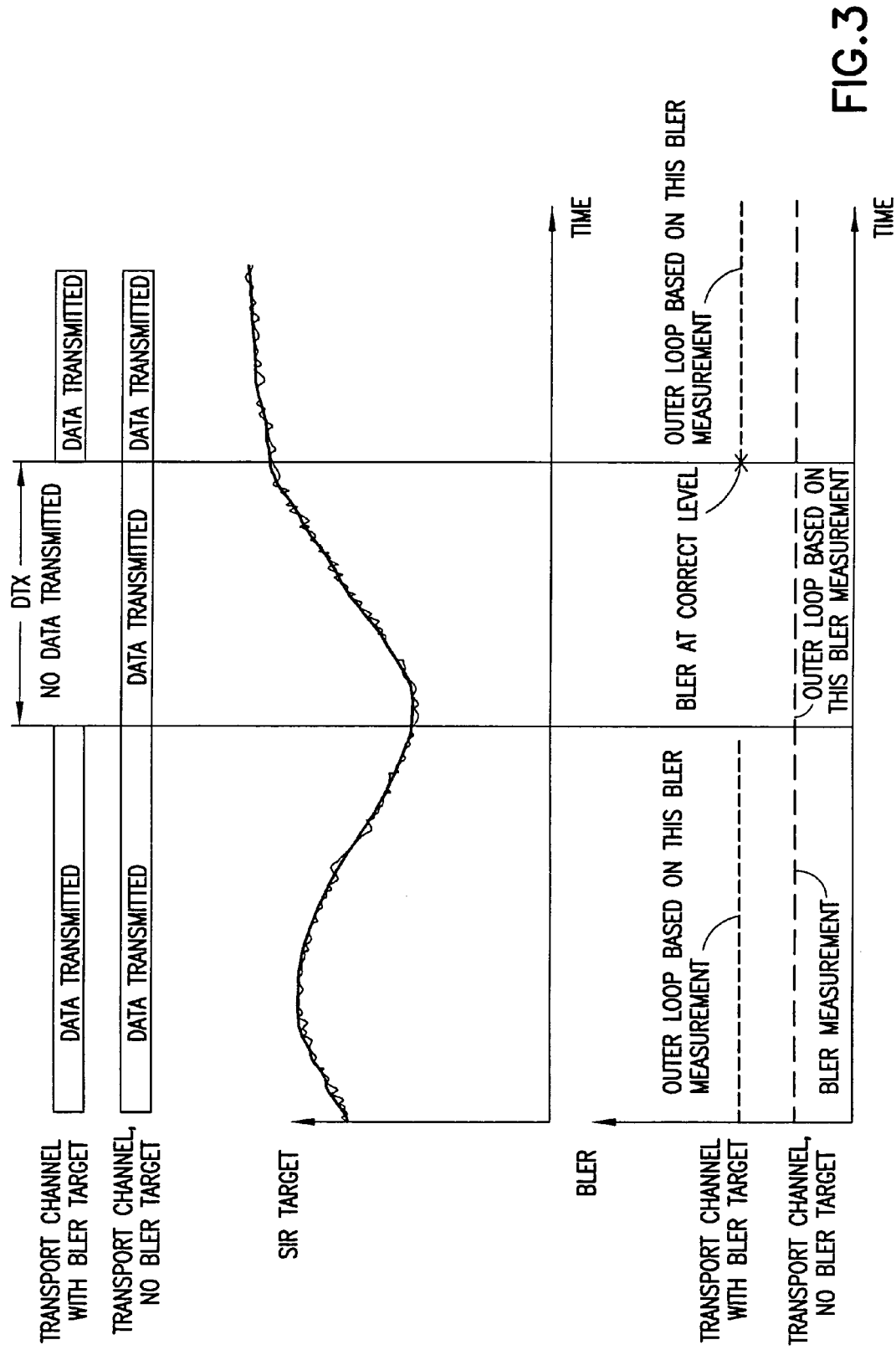
FIG. 3 is a diagram illustrating the operation of a first embodiment of this invention, where transport channels (not having a BLER target) on power controlled physical channels are available.
Figure 4:
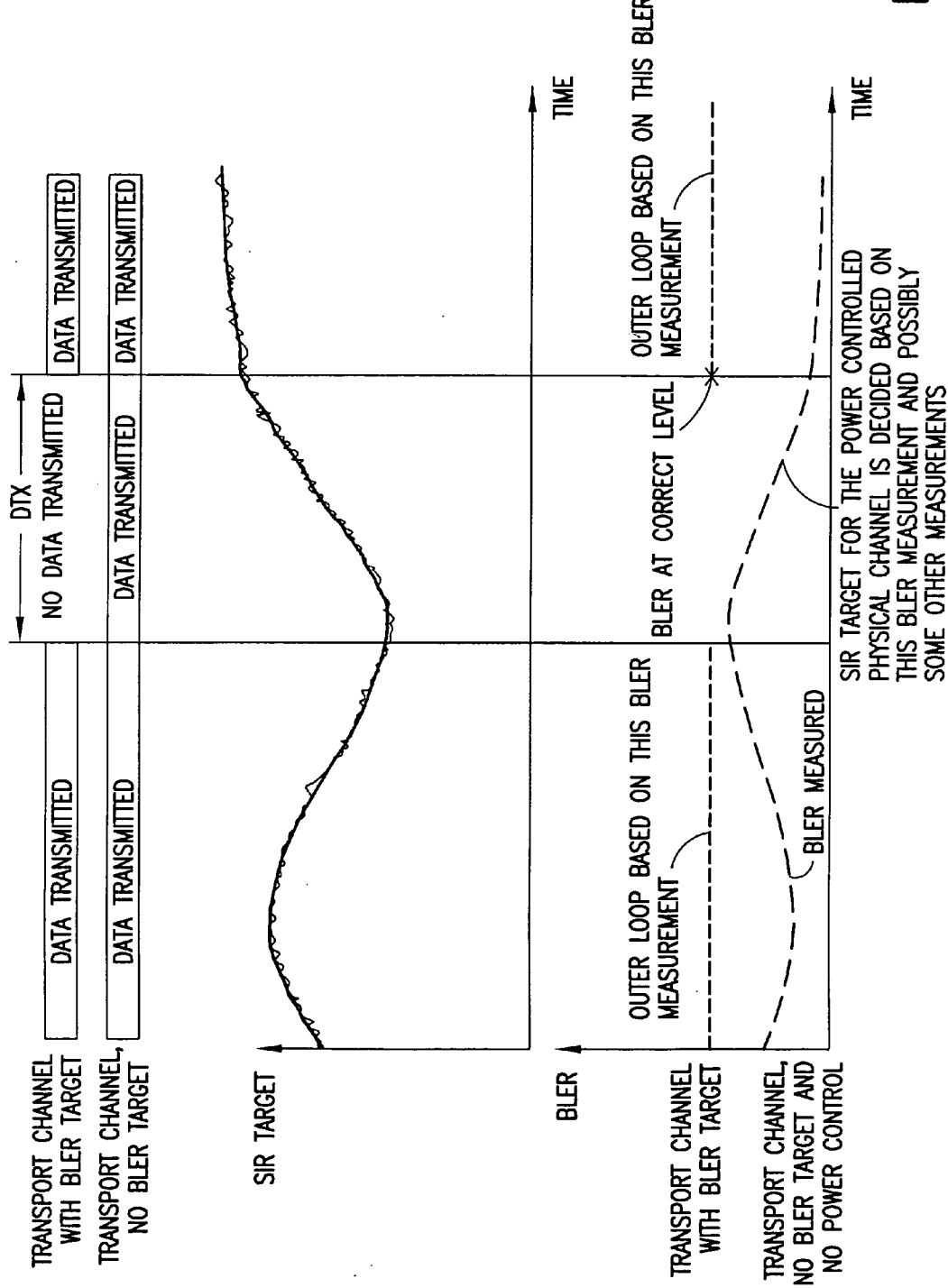
FIG. 4 is a diagram illustrating the operation of a first embodiment of this invention, where transport channels (not having a BLER target) on power controlled physical channels are not available.

Discussing the foregoing now in greater detail, and referring also to the logic flow diagram of FIG. 5, in FIGS. 3 and 4 it can be seen that there exists a DTX period in the transport channel having a BLER target. At block A the MS 100 detects the start of the DTX period and makes a determination at block B if there is a transport channel (TCh), without a network-specified BLER target, that is transmitting data. If this determination is negative, i.e. all of the downlink transport channels are currently in DTX, the MS 100 can simply terminate outer loop power control processing, or it can fall back and use some conventional, simplistic technique as mentioned above (block C). In this case the test in block B may be periodically performed to determine if any of the transport channels, not having a BLER target, are again transmitting data.

Assuming at block B that the determination is affirmative (i.e., a transport channel, without a network-specified BLER target, is transmitting data), at block D this transport channel is defined to be the reference transport channel, and a determination is made at block E as to whether the reference transport channel is on a power controlled physical channel (e.g., DPCH) or whether the reference transport channel is on a non-power controlled physical channel (e.g., P-CCPCH). This determination can be made based on the identification of the reference transport channel and on a priori knowledge assumed to be available to the MS 100 of the specifics of the transport channel characteristics (i.e., whether or not they are power controlled channels). If it is determined that the reference transport channel is on a power controlled physical channel then FIG. 3 applies, and control passes to block F, else if the reference transport channel is on a non-power controlled physical channel then FIG. 4 applies, and control passes to block I.

Assuming now the case of FIG. 3, at block F the BLER of the reference transport channel is measured, or a most recently obtained BLER measurement or measurements are used by the MS 100 to compute the current value of the SIR target, and the SIR target value is updated as required at block G. Since it is assumed that environmental changes will affect the reference transport channel on the power controlled physical channel in the same way as the transport channel now in DTX, at the end of the DTX period the SIR target value will be correctly set (neither too high or too low) for continuing communication on the transport channel at the network-specified quality level (e.g., at the network-specified BLER). This condition will continue until the transport channel with the BLER target exits the DTX state at block H, at which time the MS 100 continues with normal outer loop power control processing.

If it is determined at block E that the reference transport channel is on a non-power controlled physical channel then FIG. 4 applies, and control passes to block I where the BLER of the reference transport channel is measured, or a most recently obtained BLER measurement or measurements are used by the MS 100 to compute the current value of the SIR target, and the SIR target value is updated as required at block K. However, since it may not be assumed in this case that environmental changes will affect the reference transport channel on the non-power controlled physical channel in the same way as the transport channel now in DTX, it is preferred to base the SIR computation possibly on other measurements and/or criteria, and/or to perform the above-mentioned mapping of the quality of the reference transport channel to the SIR target/BLER relationship on the power controlled transport channel(s). This intermediate step is shown as the block J in FIG. 5, i.e., adjust the measured reference transport channel quality based on some mapping function or other criteria. The desired result is that at the end of the DTX period the SIR target value will be correctly set (neither too high or too low) for continuing communication on the transport channel at the network-specified quality level (e.g., at the network-specified BLER). This condition will continue until the transport channel with the BLER target exits the DTX state at block L, at which time the MS 100 continues with normal downlink outer loop power control processing.

It was noted above that it may be preferred to employ a mapping of the quality of the reference transport channel to the SIR target/BLER relationship on the power controlled transport channel(s). Further in this regard the quality of the common channel data can be measured continuously with a long measuring window, and when the dedicated transport channels are not transmitted, the quality of the common channel data is used to control the SIR target. The mapping function may thus be considered to be the difference between the most recent quality measures of the common channel (CCh) and the dedicated transport channel (DTrCh) before the start of DTX, i.e.:

$$\text{Mapping Function} = \text{Quality}_{DTrCh} - \text{Quality}_{CCh}.$$

The measured quality of the reference transport channel (e.g., the BLER) is thus adjusted (up or down) in block J of FIG. 5 in accordance with the value of the mapping function when the DTX period was initiated, and the adjusted value can then used to compute the updated SIR target during the DTX period at block K. Thus, it can be appreciated that the mapping is dynamic in nature. A weight factor may also be used to restrict the effect of the common channel quality to only the outer loop power control.

The teachings of this invention pertain most particularly to the outer loop power control function using BLER as a transport channel quality measure, since in the 3GPP Frequency Division Duplex, the BLER target is signaled to mobile station 100 from the network 20.

The teachings of this invention are also intended primarily for use on the downlink. In the 3GPP specification it is defined that the outer loop power control is a function of the mobile station 100. The mobile station 100 controls the downlink SIR target so that the quality target is met for each transport channel having a quality target (e.g., a BLER target) signaled by the network 20. However, those skilled in the art will appreciate that certain aspects of this invention are applicable also for use on the uplink outer loop power control function executed by the RNC (Radio Network Controller) where, it should be noted, the common channels are not required.

The frequency of updating of the BLER is not critical to the operation of this invention, as this invention deals with the situation when no data is transmitted. This being the case, substantially any BLER update frequency is adequate as compared to the conventional situation with no updating at all during DTX. However, it should be noted that in some embodiments the outer loop power control function may use, for example, soft decoder information or raw BER measurements as a quality measure of the transport channel(s), even though the BLER target is signaled to the mobile station 100 from the network 20. In general, references made above to the BLER could be replaced simply by quality or link quality. The BLER is, however, a very useful and a presently preferred example of a quality metric.

While described in the context of the use of the PDCH as a power controlled physical channel as the reference transport channel, the invention is not limited for use with only this channel. For example, the PDSCH (Physical Downlink Shared Channel) could be used as well. Furthermore, while described in the context of the use of the P-CCPCH as a non-power controlled physical channel as the reference transport channel, the invention is not limited for use with only this channel. For example, any downlink common channel could be used as well.

In general, if a BLER measurement is possible for the transport channel(s) not having a BLER target, the BLER is measured for these transport channel(s). In a case where all transport channels having a BLER target simultaneously experience DTX, the previously measured BLER value(s) are preferably used as the BLER target. If a BLER measurement is not possible, other means of determining the quality of the transport channels not having a BLER target can be used.

Thus, while described above in the context of presently preferred embodiments, those skilled in the art will recognize that various changes maybe made to the teachings of this invention, and that these changes will still fall within the scope of the teachings of this invention.

What is claimed is:

1. A mobile station executed method for updating a signal-to-interference ratio (SIR) target during a discontinuous transmission (DTX) period of a downlink transport channel having a network specified quality target value, comprising:
   measuring a quality of another downlink transport channel for which the network has not specified a quality target value; and
   updating the SIR target in accordance with the measured quality.

2. A method as in claim 1, where the downlink transport channel for which the network has not specified a quality target value is on a power controlled physical channel, and where updating uses the measured quality.

3. A method as in claim 1, where the downlink transport channel for which the network has not specified a quality target value is on a non-power controlled physical channel, and where updating comprises determining a mapping function, applying the mapping function to the measured quality to obtain a weighted quality, and using the weighted quality for updating the SIR target.

4. A method as in claim 1, where the mobile station conforms to a wide bandwidth, code division multiple access (WCDMA) third generation partnership project (3GPP) air interface standard.

5. A method as in claim 1, where the specified quality is comprised of a Block Error Rate (BLER).

6. A mobile station comprising a controller operating under a stored program for updating a signal-to-interference ratio (SIR) target during a discontinuous transmission (DTX) period of a downlink transport channel having a network specified quality target value, further comprising circuitry for measuring a quality of another downlink transport channel for which the network has not specified a quality target value, and said controller being responsive to the measured quality for updating the SIR target in accordance with the measured quality.

7. A mobile station as in claim 6, where the downlink transport channel for which the network has not specified a quality target value is on a power controlled physical channel, and where the controller operates for updating the SIR target using the measured quality.

8. A mobile station as in claim 6, where the downlink transport channel for which the network has not specified a quality target value is on a non-power controlled physical channel, and where the controller operates for updating the SIR target by determining a mapping function, applying the mapping function to the measured quality to obtain a weighted quality, and uses the weighted quality for updating the SIR target.

9. A mobile station as in claim 6, where the mobile station conforms to a wide bandwidth, code division multiple access (WCDMA) third generation partnership project (3GPP) air interface standard.

10. A mobile station as in claim 6, where the specified quality is comprised of a Block Error Rate (BLER).

11. A mobile station executed outer loop power control method for updating a signal-to-interference ratio (SIR) target during a discontinuous transmission (DTX) period of a downlink transport channel having a network specified Block Error Rate (BLER) target value, comprising:
    obtaining a BLER value of another downlink transport channel for which the network has not specified a quality target value; and
    updating the SIR target in accordance with the obtained BLER value.

12. A method as in claim 11, where updating further comprises determining whether the downlink transport channel for which the network has not specified a quality target value is on a power controlled physical channel or a non-power controlled physical channel, and if the downlink transport channel for which the network has not specified a quality target value is determined to be on a non-power controlled physical channel, further comprising determining a mapping function, applying the mapping function to the obtained quality to derive a weighted quality, and using the weighted quality for updating the SIR target.

13. A method as in claim 11, where the mobile station conforms to a wide bandwidth, code division multiple access (WCDMA) third generation partnership project (3GPP) air interface standard.

14. An outer loop power control method for updating a signal-to-interference ratio (SIR) target during a discontinuous transmission (DTX) period of a transport channel having a network specified Block Error Rate (BLER) target value, comprising:
    obtaining a BLER value of another transport channel for which the network has not specified a quality target value; and
    updating the SIR target in accordance with the obtained BLER value.

15. A computer program product comprising a computer useable medium including a computer readable program, wherein the computer readable program when executed on the computer causes the computer to operate a mobile station by operations comprising:
    updating a signal-to-interference ratio (SIR) target during a discontinuous transmission (DTX) period of a downlink transport channel having a network specified quality target value by determining a quality of another downlink transport channel for which the network has not specified a quality target value and updating the SIR target in accordance with the determined quality.

16. The computer program product as in claim 15, where the downlink transport channel for which the network has not specified a quality target value is on a power controlled physical channel, and where updating uses the determined quality.

17. The computer program product as in claim 15, where the downlink transport channel for which the network has not specified a quality target value is on a non-power controlled physical channel, and where updating comprises determining a mapping function, applying the mapping function to the determined quality to obtain a weighted quality, and using the weighted quality for updating the SIR target.

18. A device comprising:
    means for receiving a signal from a network; and
    means for updating a signal-to-interference ratio (SIR) target during a discontinuous transmission (DTX) period of a downlink transport channel having a network specified quality target value, comprising means for determining a quality of another downlink transport channel for which the network has not specified a quality target value and for updating the SIR target in accordance with the determined quality.

19. The device as in claim 18, where the downlink transport channel for which the network has not specified a quality target value is on a power controlled physical channel, and where said updating means uses the determined quality.

20. The device as in claim 18, where the downlink transport channel for which the network has not specified a quality target value is on a non-power controlled physical channel, and where said updating means further comprises means for determining a mapping function, for applying the mapping function to the determined quality to obtain a weighted quality, and where said updating means uses the weighted quality for updating the SIR target.

* * * * *